Oct. 8, 1968  P. J. JACOBS  3,404,618
COMBINATION HEATING, VENTILATING AND RECIRCULATING
SYSTEM FOR GREENHOUSES
Original Filed Dec. 22, 1966  2 Sheets-Sheet 1

INVENTOR.
Paul J. Jacobs
BY
Attorneys

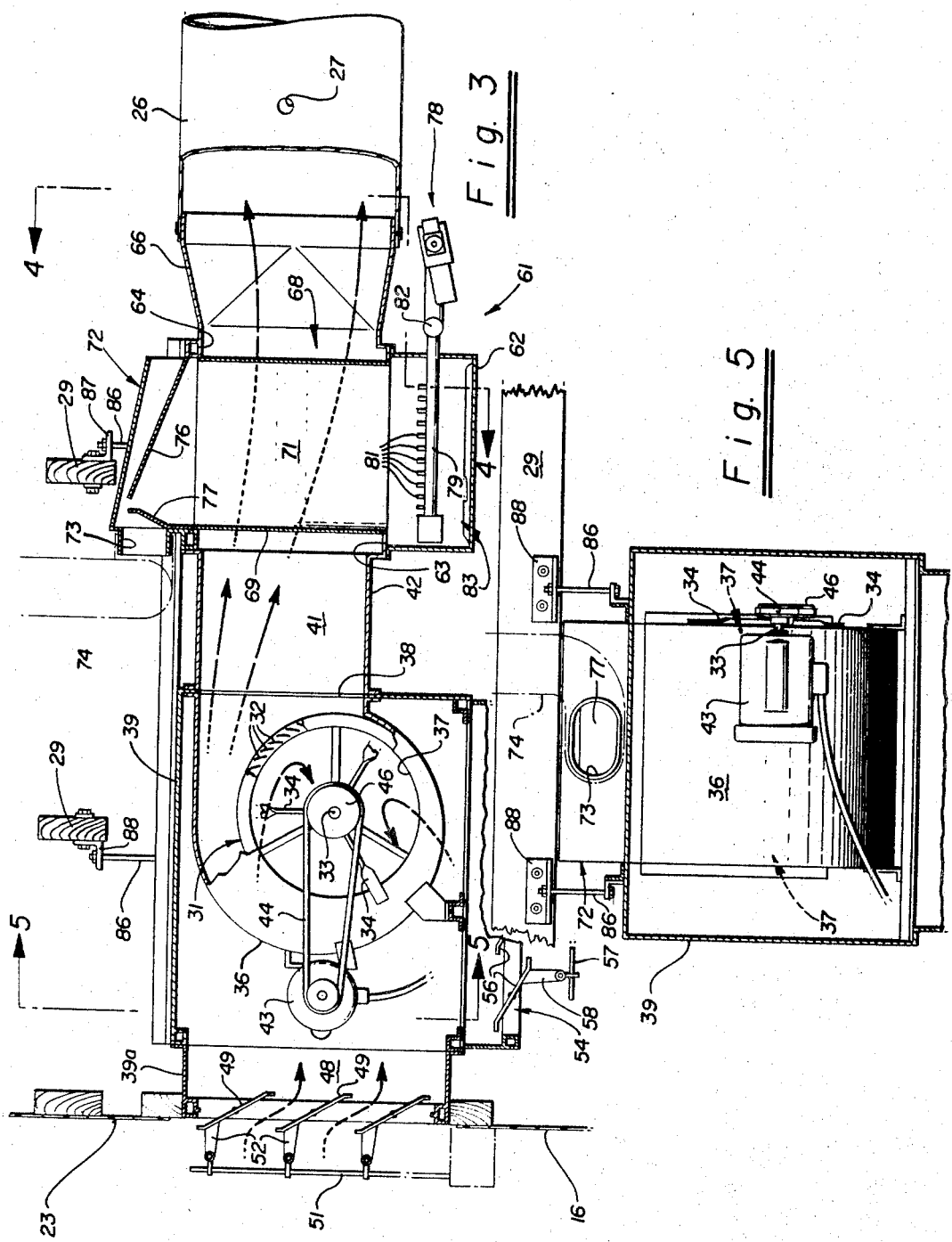

United States Patent Office 3,404,618
Patented Oct. 8, 1968

3,404,618
COMBINATION HEATING, VENTILATING AND RECIRCULATING SYSTEM FOR GREENHOUSES
Paul Joseph Jacobs, Sherman Oaks, Calif., assignor to Jacobs Bros. Textile Co., Inc., Sepulveda, Calif., a corporation of California
Continuation of application Ser. No. 603,897, Dec. 22, 1966. This application Dec. 26, 1967, Ser. No. 693,680
13 Claims. (Cl. 98—33)

ABSTRACT OF THE DISCLOSURE

A greenhouse ventilating apparatus having a blower for recirculating air within the building and for inducing the flow of outside air into the building. A heater is positioned adjacent the blower for raising the temperature of the air in the greenhouse.

Cross-reference to related application

This application is a continuation of application No. 603,897 filed Dec. 22, 1966, now abandoned.

This invention relates to a combination heating, ventilating and recirculating system and more particularly to such a system for greenhouses.

In general, it is an object of the present invention to provide a combination heating, ventilating and recirculating system for greenhouses which makes it possible to obtain improved characteristics for heating and ventilating greenhouses.

Another object of the invention is to provide a system of the above character in which it is possible to obtain a more uniform distribution of heat in the greenhouse.

Another object of the invention is to provide a system of the above character in which greater and more uniform air movement is obtained.

Additional objects and features of the invention will appear from the following description in which the preferred embodiment is set forth in detail in conjunction with the accompanying drawings.

Referring to the drawings:

FIGURE 3 is a cross-sectional view in side elevation of the system shown in FIGURE 2.

FIGURE 5 is a cross-sectional view taken along the line 5—5 of FIGURE 3.

Figure 2:
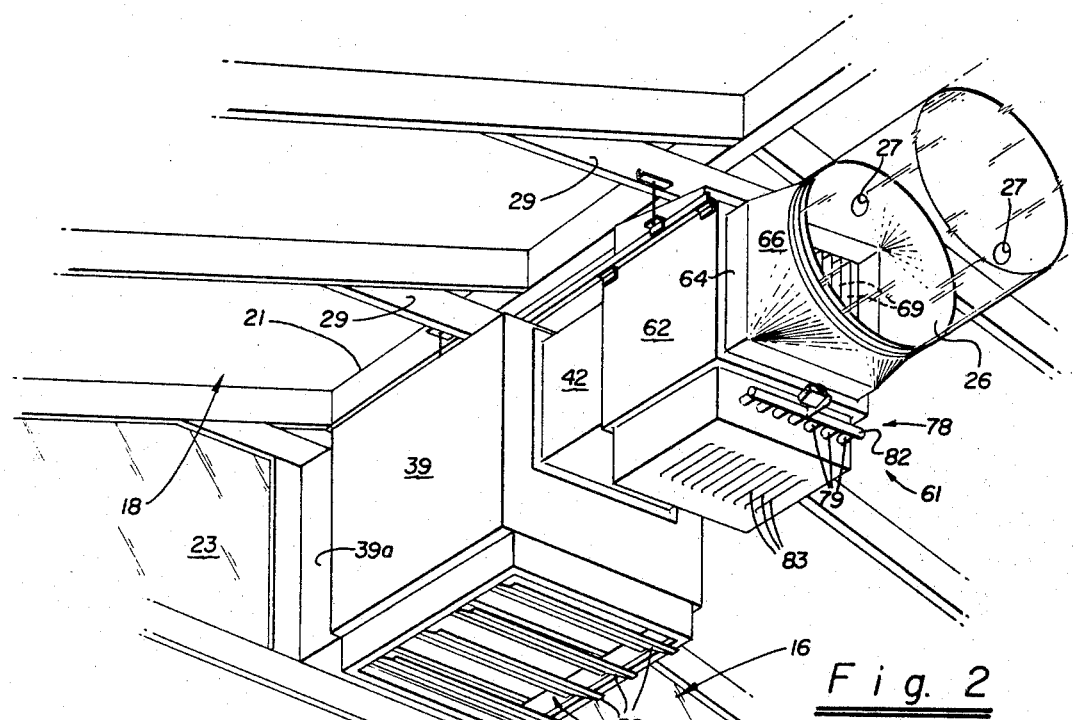
FIGURE 2 is an isometric view of the system shown in FIGURE 1.

In general, the combination heating, ventilating and recirculating system for greenhouses comprises an elongate transparent tube which has openings therein spaced longitudinally thereof. Means is provided for supporting the tube adjacent the ridge of the greenhouse. An opening is provided in the gable of the greenhouse at one end of the greenhouse. Shutter or louver means is provided for controlling the flow of air through the hole in the gable into the greenhouse. A motorized fan is mounted within the greenhouse. The motorized fan is positioned in the housing within the greenhouse which has an opening which leads to the opening in the gable in the greenhouse and also has another opening which opens into the interior of the greenhouse. Both of the openings are provided with louvers or shutters to control the amount of air taken from the outside atmosphere and the amount of air which is recirculated within the greenhouse. The blower means is of a type which can create a high static pressure to increase the flow of air through the tube. Heating means is mounted within the housing for heating the air as it is advanced through the housing into the tube to raise the temperature of the air before it is discharged into the tube. Means is provided for controlling the louvers or shutters to the openings to the housings.

More particularly as shown in the drawings, a greenhouse 11 is provided which consists of a plurality of sections 12 which are commonly called ridges. The greenhouse 11 is provided with side walls (not shown). Each of the sections or ridges is provided with front and rear walls 16 and 17. Each section is also provided with an inclined roof 18, the upper extremity of which forms a ridge 21. The front wall 16 includes a gable 23.

Each of the sections of the greenhouse 11 can be of any suitable size as, for example, 20 ft. wide x 100 ft. long. In elevation, the greenhouse can also be of any suitable dimension as, for example, 6 ft. from the ground to the roof 18 and 42 inches from the bottom of the roof to the ridge 21.

The combination heating, ventilating and recirculating system consists of a transparent convection tube 26 formed of a suitable material such as a substantially transparent plastic. The convection tube can be made of any suitable size as, for example, 30 inches in diameter and is provided with a plurality of holes 27 spaced longitudinally of the convection tube on opposite sides thereof. The holes 27 can be of any suitable size as, for example, 2½ inches in diameter, and can be spaced in any desired manner. However, to obtain uniform distribution of the air within the greenhouse, the holes are located on the sides of the convection tube opposite each other and spaced apart a suitable distance as, for example, 2 ft. along each side of the tube. The convection tube 26 can be supported in any suitable manner in each section of the greenhouse but preferably is supported in a position which is central of the sides of the greenhouse and adjacent the top of the greenhouse. Thus, by way of example, the convection tube can be supported from the roof 18 by means of wires 28 secured to the rafters 29 and secured to the tube 26.

Means is provided for continuously supplying a stream of air to the end of the convection tube 26 which is adjacent the opening in the gable 23 and consists of a blower 31 of the squirrel-cage type and which has a plurality of blades or vanes 32 which extend in a direction which is parallel to the axis of rotation for the blower. The blower 31 is mounted upon a shaft 33 rotatably mounted in bearings (not shown) carried by support members 34 secured to a substantially cylindrical blower housing 36. The blower housing 36 is provided with openings 37 on opposite ends of the blower 31 which serve as inlet openings and an opening 38 which serves as a discharge opening. The blower housing 36 is mounted within a larger, substantially rectangular housing 39. The housing 36 is mounted on one wall of the housing 39 so that the opening 38 is in communication with a flow passage 41 in the housing 39 and a connecting tube 42 mounted on the housing 39. Means is provided for driving the blower 31 and consists of an electric motor 43 mounted upon the blower housing 36 which drives a belt 44 that drives a pulley 46 affixed to the shaft 33.

The housing 39 is provided with an extension 39a which fits into the opening provided in the gable 23 of the greenhouse as shown particularly in FIGURE 3. The extension 39a forms a first inlet passage 48 into the housing 39. The flow of air through the inlet passage 48 is controlled by a plurality of louvers or shutters 49 which are rotatably mounted within the extension 39a for rotation about parallel horizontal axes. Means is provided for operating the louvers and consists of a rod 51 which is provided with spaced links 52 pivotally connected to the louvers 49. The rod 51 either can be manually actuated or can be actuated automatically by the use of an electrically operated motor to move the louvers 49 between open and closed positions. In a completely open position, the louvers extend in spaced substantially horizontal planes, whereas when they are in a closed position, they extend in a common generally vertical plane.

The housing 39 is also provided with a bottom opening 54 which serves as a second inlet passage through which air can flow into the housing 39. The bottom inlet opening 54 is in communication with the interior of the greenhouse, whereas the inlet passage 48 is in communication with the outside exterior atmosphere. The flow of air through the bottom inlet opening 54 is also controlled by a plurality of louvers 56 which are pivotally mounted on the housing 39 for pivotal movement about spaced parallel, substantially horizontal axes. Means is provided for operating the louvers or shutters 56 and consists of a rod 57 which is provided with a plurality of spaced links 58 pivotally connected to the louvers 56. In an open position, the louvers 56 extend in spaced parallel vertical planes, whereas when they are in a closed position they extend in a common horizontal plane.

With the foregoing construction of the housing 39, it can be seen that the blower 31 can be provided with air either from the outside atmosphere or from the interior of the greenhouse for a purpose hereinafter described. Means is provided for heating the air after it is discharged by the blower and consists of a heater 61. The heater 61 can be of any suitable type such as a gas-fired heater. It consists of a rectangular housing 62 which is provided with a large inlet passage 63 and a large outlet passage 64 through which the air from the blower 31 can pass. A large outlet duct 66 is mounted upon the housing and has one end of the tube 26 secured thereto and carries the air from the outlet passage 64 into the tube 26. A heat exchanger 68 is mounted within the heater housing 62 and consists fo a plurality of spaced generally parallel air foil contoured tubes 69 which extend in a vertical direction from the front to the rear of the burner housing 62. The tubes 69 are provided with vertical passages 71 through which burner gases may rise into a hood 72 mounted on the burner housing 62. The hood is provided with an outlet 73 which is connected to additional ducting 74 which passes up through the roof of the greenhouse to permit the exhaust gases to be discharged to the atmosphere. Metal members 76 and 77 are provided within the hood and serve as a draft diverter.

A burner assembly 78 is mounted in the lower portion of the burner housing 62 and consists of a plurality of spaced parallel burners 79 which have a plurality of upwardly facing burner ports 81 underlying the passages 71. A gas manifold 82 is provided for supplying the gas to the burners 79. A plurality of secondary air inlet passages 83 are provided on the bottom of the burner housing 62.

The housing 39 and the housing 62 can be secured to the roof of the greenhouse in any suitable manner as, for example, by the use of the bolts 86 and the brackets 87 and 88 so that they are in general horizontal alignment with each other and the opening in the gable 23 and with the plastic distribution tube 26.

Figure 1:
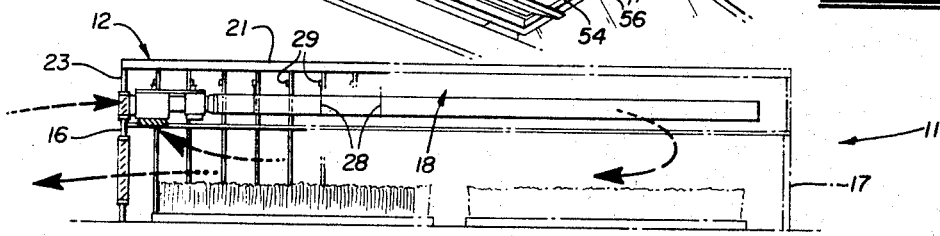
FIGURE 1 is a cross-sectional view in side elevation of one of the ridges of a greenhouse incorporating the combination heating, ventilating and recirculating system.
Figure 4:
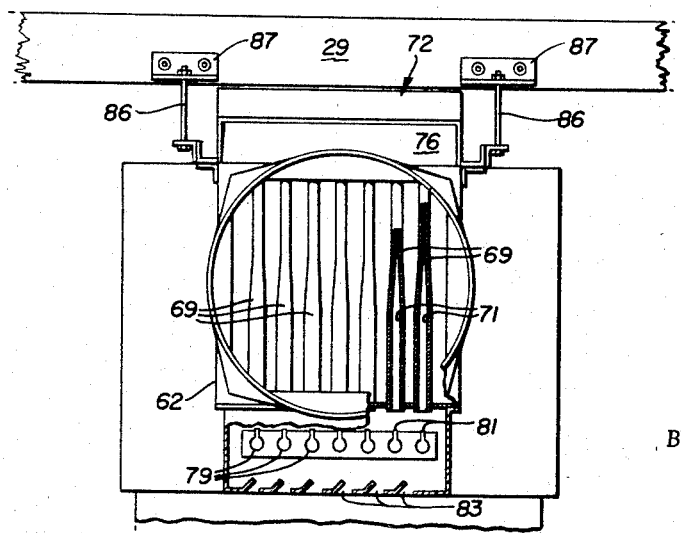
FIGURE 4 is an end elevation view taken along the line 4—4 of FIGURE 3.

Operation of the combination heating, ventilating and recirculating system for green houses may now be briefly described as follows. Let it be assumed that it is nighttime. When such is the case, the outside air is relatively cool and the louvers 49 would be in a closed position so that no outside air would be permitted to enter the greenhouse. As pointed out previously, the positions of the louvers 49 can be controlled by thermostats measuring the temperature in the greenhouse and the outside temperature. Thus, when the outside temperature drops below a predetermined level, automatic means can be provided for closing the shutters 49. When this is the case, the blower 31 which is continuously operating recirculates the air within the greenhouse by drawing the air within the greenhouse through the bottom inlet opening 54 and through the squirrel-cage fan which discharges the same through the passage 41 and through the heater 61. The heater 61 can also be thermostatically controlled by thermostats positioned within the greenhouse to maintain the greenhouse at a predetermined temperature. When the temperature in the greenhouse falls below this predetermined temperature, the burners 79 are automatically ignited to cause the air being discharged from the blower 31 to be heated to the desired temperature and then to pass through the large distribuion plastic tube 18 to distribute the air uniformly throughout the greenhouse as shown by the arrows in FIGURE 1.

It has been found that the use of a squirrel-cage blower in the present system is particularly advantageous in that it is possible to obtain a much more uniform distribution of the air in the greenhouse. This is possible because the squirrel-cage blower serves to provide a more uniform movement of air through the tube and also because the squirrel-cage blower is capable of delivering air at a higher static pressure to overcome any pressure build-up within the long plastic tube within the greenhouse. By heating the air as it is discharged from the squirrel-cage blower, it is possible to obtain a more uniform heating of the greenhouse and to maintain the greenhouse more closely to the desired predetermined temperature required for growing of the plants in the greenhouse. Because the squirrel-cage blower is able to overcome the pressure build-up within the convection tube 18, it is possible to obtain a uniform distribution of the heated air throughout the greenhouse to prevent the occurrence of any cold spots in the greenhouse. At the same time by continuously recirculating the air within the greenhouse, it is possible to maintain the greenhouse at a uniform humidity and also to keep the leaves of the plants dry.

Thus, during the nighttime, the system serves to continuously recirculate the air within the greenhouse to keep the greenhouse heated to the desired minimum temperature. In the morning after the sun has risen, and when the temperature in the greenhouse begins to rise, the air no longer needs to be heated. Thereafter, if the temperature rises above the desired temperature, automatic means is provided for opening the louvers 49 to permit a certain amount of cold outside air to be drawn into the blower 31 and to be mixed with the air being recirculated in the greenhouse to cool the air. This cooled air is distributed through the convection tube 26 to maintain the temperature of the greenhouse at the desired temperature. If the temperature of the greenhouse still continues to rise, the louvers 49 will be opened still further to permit more outside air to enter and be mixed with the recirculating air within the greenhouse. At the same time, the bottom louvers 56 can be gradually closed so that more and more fresh air is brought in from the outside into the greenhouse. Maximum cooling can be achieved by completely closing the bottom louvers 56 and bringing completely fresh air into the greenhouse.

As is well known to those skilled in the art, additional supplemental cooling can be provided by the use of water-cooled pads and by drawing air through the water-cooled pads into the greenhouse.

Now let it be assumed that the temperature in the greenhouse is decreasing as nightfall approaches. When this occurs, the reverse procedure takes place in that the louvers 49 are gradually closed and the louvers 56 are gradually opened so that less outside air is brought in as the outside temperature drops. This continues until the louvers 49 are completely closed and the louvers 56 are completely open so that the inside air within the greenhouse is recirculated. If the temperature in the greenhouse still continues to drop, the thermostatically controlled heater heats the air to the desired temperature.

From the foregoing, it can be seen that the system serves to provide a means for heating the air within the greenhouse and also for recirculating the air. In addition, means is provided for ventilating the greenhouse to the outside air and to cool the greenhouse by circulating the outside air through the greenhouse. With such a system, it is possible to maintain the temperature throughout the greenhouse so that it is substantially uniform and at the same time obtain a substantially uniform distribution of the air throughout the greenhouse.

I claim:

1. In a combination heating, ventilating and recirculating system for greenhouses having an opening therein, an elongated substantially transparent tube disposed within the greenhouse and having openings therein spaced longitudinally of the tube, means for supporting the tube within the greenhouse, a blower, means for mounting said blower in said greenhouse so that it is in proximity to the opening in the greenhouse but spaced from the opening in the greenhouse, a housing enclosing said blower and having a flow passage therein and a first inlet opening in communication with the opening in said greenhouse and also having a second inlet opening which opens into the interior of the greenhouse, said housing also having a discharge opening, a heater mounted on said housing for receiving and heating the air as it is discharged by said blower, said heater having an outlet, means connecting said outlet to said tube whereby said blower delivers a stream of fair through said heater and into said tube to cause the air to be distributed substantially uniformly throughout the greenhouse, and means for controlling the flow of air through the first and second inlet opening in said housing.

2. A system as in claim 1 wherein said blower is a squirrel-cage blower capable of generating a substantial static pressure to overcome pressure build-up in the tube.

3. A system as in claim 2 wherein the pressure generated by said blower is sufficient to overcome the static pressure in said tube.

4. A system as in claim 1 wherein said heater comprises burner means and heat exchanger means comprising a plurality of spaced substantially parallel vertically disposed ducts through which the heated gases from the burner means pass and between which the air from the blower can pass.

5. A system as in claim 1 wherein said blower, said heater and said tube are in substantial horizontal alignment.

6. In a combination heating, ventilating and recirculating system for greenhouses having an opening therein, an elongate substantially transparent tube disposed within the greenhouse and having opinings therein spaced longitudinally of the tube, means for supporting the tube within the greenhouse, a housing supported within the greenhouse and having first and second inlet openings and an outlet opening therein, means connecting the inlet opening of the housing to the opening in the greenhouse so that outside atmospheric air can pass into the housing, the second opening being in communication with the interior of the greenhouse, a squirred-cage blower disposed within said housing, a substantially cylindrical blower housing mounted within said first named housing and having at least one inlet opening therein, said blower housing having an outlet opening in registration with the outlet opening in said housing, means for driving said squirrel-cage blower, a heater mounted in said greenhouse, said heater comprising a heater housing having inlet and outlet openings, means connecting the inlet opening of said heater housing to the outlet opening of said first named housing, means connecting the outlet of said heater housing to said tube, burner means disposed within said heater housing and heat exchanger means mounted in said heater housing for supplying the heat from said burner means to the air passing through said heater housing, louver means disposed in the first and second inlets of said first named housing and means for operating said louvers to move the same between open and closed positions to control the flow of air through said first and second inlet openings.

7. A system as in claim 6 wherein the opening in said greenhouse, the first named housing, the heater housing and the tube are in substantial horizontal alignment.

8. In a combination heating, ventilating and recirculating system for greenhouses of the type having an opening therein, an elongate substantially transparent tube disposed within the greenhouse and having openings therein spaced longitudinally of the tube, means for supporting the tube within the greenhouse, housing means within the greenhouse, said housing means having a flow passage therein and a first inlet opening in communication with the opening in said greenhouse and with said flow passage, and a second inlet opening in communication with the interior of the greenhouse and with said flow passage, said housing means also having a discharge opening in communication with said flow passage, means mounted on said housing means and spaced from said first inlet opening for creating a stream of air in said flow passage and serving to direct said stream of air through said discharge opening, heater means mounted on said housing for receiving and heating air as it is discharged through the discharge opening in said housing, said heater having an outlet, means connecting said tube to said outlet whereby said stream of air after passing through said heater means passes into said tube to cause the air to be distributed substantially uniformly throughout the greenhouse, and means for controlling the flow of air through said first inlet opening in said housing means.

9. A system as in claim 8 together with means for controlling the flow of air through said second inlet opening in said housing means.

10. In a combination heating, ventilating and recirculating system for use in greenhouses of the type having an opening therein and having an elongate tube disposed within the greenhouse and having openings therein spaced longitudinally of the tube, housing means, said housing means having a flow passage therein, said housing means also having first and second inlet openings and a discharge opening in communication with the flow passage, heater means mounted on said housing means and having a flow passage and an inlet opening and a discharge opening in communication with the flow passage, said inlet opening in said heater means being in communication with the discharge opening in said housing means, means mounted in the housing means spaced from the first inlet opening in the housing means for causing the movement of air through the flow passage in said housing means and through the flow passage in said heater means to the discharge opening of the heater means, said housing means being adapted to be mounted in the greenhouse so that the first inlet opening in the housing means is in communication with said opening in the greenhouse and so that said second inlet opening in the housing means is open to the interior of the greenhouse and the discharge opening in the heater means is in communication with one end of the tube.

11. A system as in claim 10 together with means for controlling the flow of air through the first inlet opening in said housing means.

12. A system as in claim 11 together with means for controlling the flow of air through the second inlet opening in said housing means.

13. A system as in claim 10 wherein said first and second inlet openings are spaced approximately 90° from each other.

References Cited

UNITED STATES PATENTS

| 2,702,503 | 2/1955 | Wildhaber | 98—33 |
| 2,896,061 | 7/1959 | McMillian | 98—33 |
| 2,983,213 | 5/1961 | Bohanon | 98—33 |
| 3,307,469 | 3/1967 | Bohanon | 98—121 |
| 3,318,224 | 5/1967 | Bohanon | 98—33 |

MEYER PERLIN, *Primary Examiner.*